July 1, 1952  E. REICH  2,602,131
HEATING DEVICE
Original Filed Oct. 2, 1937  2 SHEETS—SHEET 2
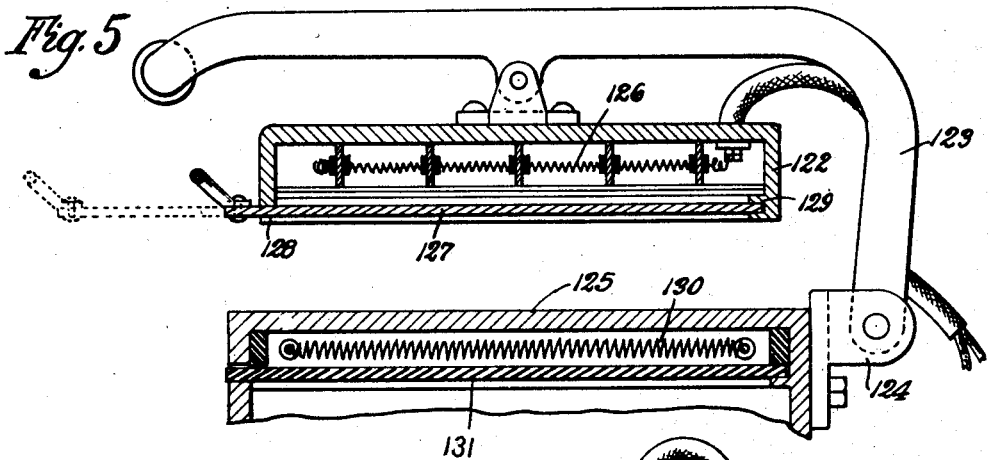
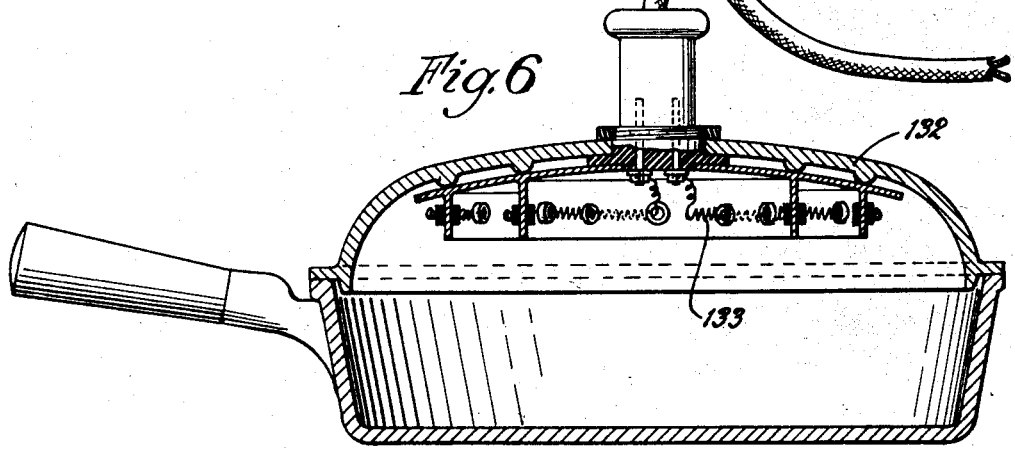
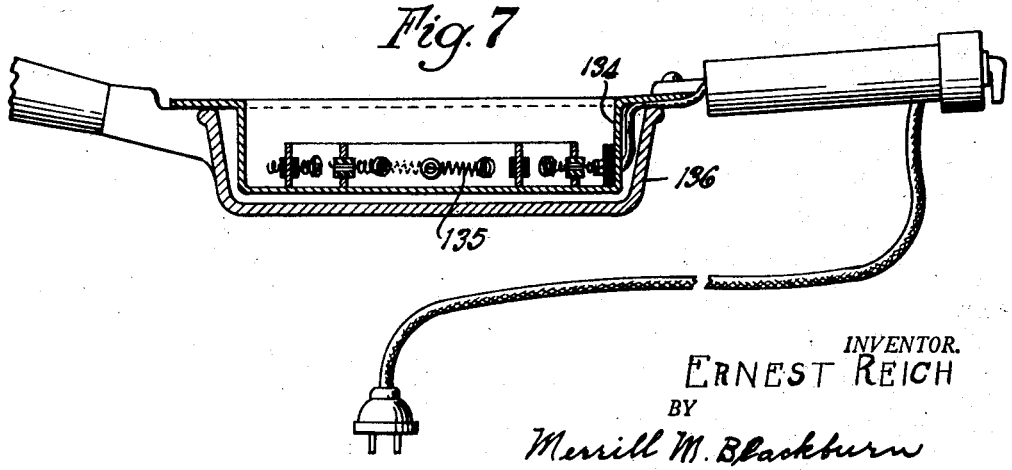
INVENTOR.
ERNEST REICH
BY
Merrill M. Blackburn Patented July 1, 1952

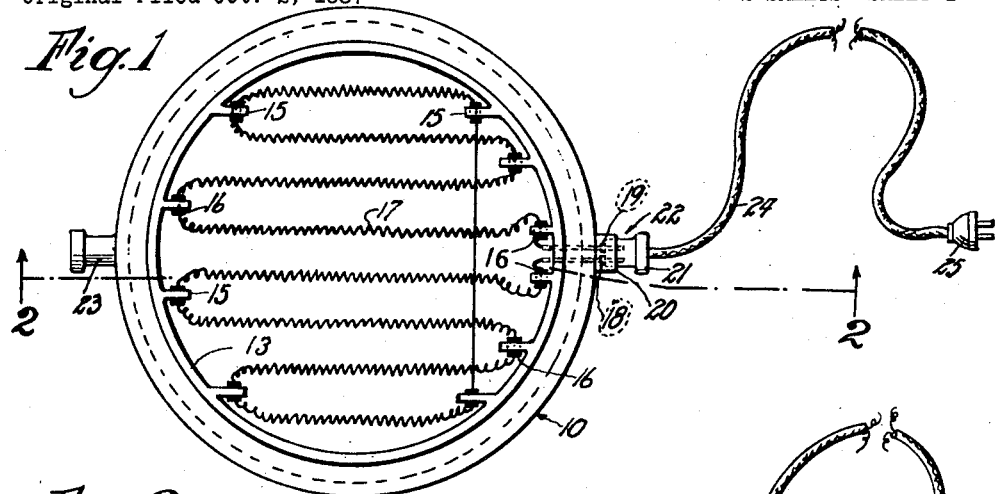
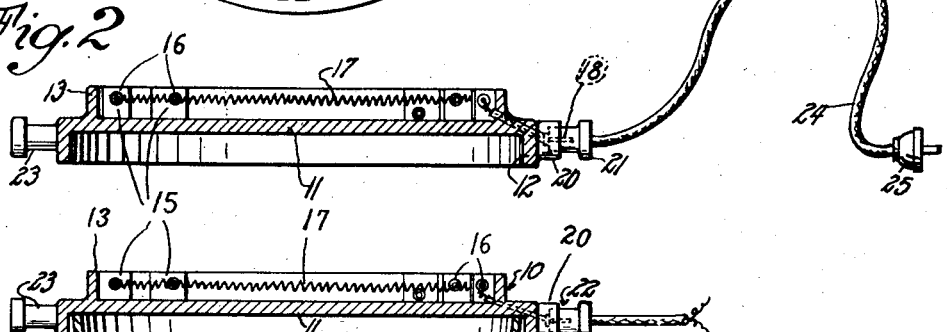
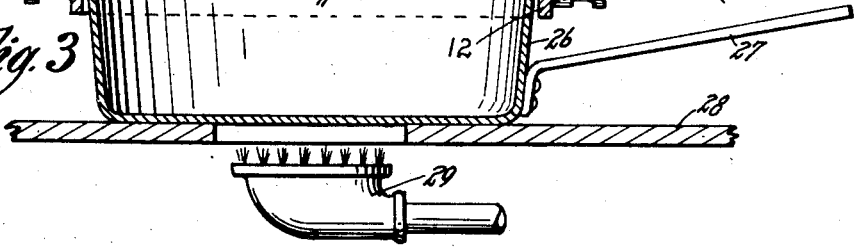
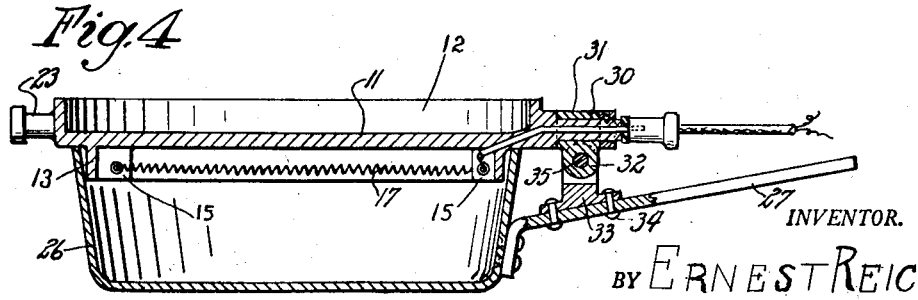

2,602,131

UNITED STATES PATENT OFFICE 2,602,131

HEATING DEVICE

Ernest Reich, Forest Hills, N. Y.

Original application October 2, 1937, Serial No. 166,987. Divided and this application February 27, 1947, Serial No. 731,341

1 Claim. (Cl. 219—19)

This invention relates to the art of preparing food and, more particularly, to a novel apparatus for imparting heat to food. While the present invention is described primarily in conjunction with the preparation of food, yet its utility extends beyond that scope and may be applied wherever heat influence is desired to modify, alter, or vary the physical or chemical properties of substances.

The art of preparing food includes boiling, frying, grilling, broiling, baking, toasting, roasting, and parboiling. In these various forms, the food is either exposed to conducted heat, such as by boiling, frying, or grilling, or is exposed to radiant glow heat, such as broiling and toasting. The distinction made between the two kinds of heat is based on whether or not the heat is directly received from the heat source or indirectly by the interposition of a conductor.

Among the objects of this invention are the provision of an apparatus for the application to food under pressure of conducted heat and of radiant glow heat; the provision of an apparatus for the application of conducted and radiant glow heat by which the food is cooked and by which desirable coloring thereof may be secured without diminishing the liquid content of the food to any appreciable extent; the provision of a heating element which, at one side, gives off conducted heat and, at its other side, radiant glow heat; the provision of a reversible heating element which emits conducted and radiant glow heat and which may cooperate with another heating element, applying either conducted or radiant glow heat to the food; the provision of a food cooker which may apply conducted heat to one side of the food and simultaneously apply radiant glow heat to the opposite side of the food whereby to produce desirable coloring of the food without substantial loss of moisture.

With these and other equally important objects in view, the invention comprises the means described in the following specification, particularly pointed out in the claim forming a part thereof and illustrated in the accompanying drawings, in which, Fig. 1 is a top plan view of a cover for a skillet constructed in accordance with my invention;

Fig. 2 is a section on the line 2—2 of Fig. 1;

Fig. 3 is a section through a skillet to which the cover is applied;

Fig. 4 is a view similar to Fig. 3 with the cover in reversed position and permanently secured to the skillet;

Fig. 5 is a section through another form of this device;

Fig. 6 is a section through a modification of a skillet shown in Fig. 3; and

Fig. 7 is a section through a further modification of a skillet.

From time immemorial food has been cooked by bringing the food into contact with a plate of metal or other suitable substance which is heated by gas, coal, electricity, or some other means. The heat thus generated and conducted through the plate is imparted by contact with the food, and such heat is designated as "conducted heat." If the food is exposed to the influence of heat from a flame or the like acting directly on the food without the interposition of a conductor, it may be designated as "radiant glow heat." In the preparation of food, flavor and appearance, in addition to the retention of the natural juice of the food, are important factors.

The apparatus disclosed herein may be utilized in various ways in the preparation of food and I therefore do not wish to be limited in any way to any particular method of cooking, all methods of utilization of the apparatus herein disclosed being regarded as coming within the normal field of use of this apparatus. Preferably, although not necessarily, the food is subjected to pressure while under the influence of both conducted and radiant glow heat.

Referring more in detail to the annexed drawings, and particularly to Figs. 1 to 4, inclusive, there is shown a cover which is designated in general by the numeral 10. This comprises a disc 11 formed with a downwardly extending annular flange 12 adapted to encompass a skillet or other cooking utensil. While the disc in the present instance is shown circular, it is, of course, understood that any other shape or configuration may be selected to conform to the contour of the particular cooking utensil. The disc is also provided with an upstanding annular flange 13 of smaller diameter than the disc 11 so that, upon reversal of the cover, the flange 13 projects into a cooking utensil.

The flange 13 is provided with a plurality of lugs 15 which are apertured to receive insulating bushings 16 through which is strung a heating element or wire 17, the ends of which lead to contact terminals 18 and 19 in a socket 20 adapted to receive a plug 21 which complements said socket to provide a handle 22. Diametrically opposite to the handle 22 is another handle 23, whereby manipulation of the cover is facilitated. From the plug 21 leads a cable 24 to another plug 25, which may be inserted in the usual house socket constituting a source of electrical energy for heating the wire 17. In Fig. 3, the cover is applied to a skillet 26 equipped with a handle 27 and shown on the top plate 28 of a kitchen stove where a burner 29 supplies heat to the skillet. The food in the skillet may be subjected to the conducted heat emitted from the skillet and the cover 10, when in the position shown in Fig. 3, or may be subjected to radiant glow heat from the heating element 17, when arranged in the position shown in Fig. 4.

In Fig. 4, the cover is slightly modified to be permanently attached to the skillet. Instead of the handle 22, the cover is provided with a trunnion 30 which has a central bore for the passage of the wires 17. The trunnion is received in a bearing 31 formed with a downwardly extending lug 32 received in a U-shaped bracket 33 secured to the skillet handle 27 by rivets 34 or other fastening means. A pivot pin 35 passes through the bracket 33 and the lug 32. It is evident that the cover may be tilted about the pin 35 and also rotated about the trunnion 30 in the bearing 31 so that the heating element may be received within the skillet or be extraneous thereto, depending on whether conducted heat or radiant glow heat is to be supplied from the top.

The modification shown in Fig. 5 has the top heating plate 122 secured to an arm 123, pivotally secured to a bracket 124, fastened to a lower heating plate 125. As shown, the heating plate 122 is hollow and open at the bottom to permit radiant glow heat to emit from the heating element 126. If desired, the radiant glow heat of the upper plate may be converted into conducted heat and, to this end, a plate 127 is provided which may be inserted through a slot 128 and is finally seated in a groove 129 and serves to close up the lower open end of the plate 122.

Upon the insertion of the plate 127, heat is transmitted therethrough, so that, instead of radiant glow heat, conducted heat is emitted. The plate 127 may be of steel, cast iron, aluminum, or copper, depending upon the speed with which the heat is to be emitted. In the case of steel or cast iron, more time is consumed with the heating up process than when aluminum or copper is employed. The lower plate 125 has a heating element 130 under which insulation is provided to restrict the heat from conduction. The layer of insulation may be removed and, instead, a plate, similar to plate 127, may be inserted, so as to cause conducted heat to be emitted.

The modification shown in Fig. 6 is a skillet which has a cover 132 in which a heating element 133 is built, capable of emitting radiant glow heat. In Fig. 7, the cover 134 is drawn deep so that the heating element 135, through the bottom of the cover, emits conducted heat and, at the same time, the cover is capable of applying pressure on the food, arranged on the bottom of the utensil 136. Upon reversal of the cover, of course, radiant glow heat is emitted.

This application is a division of Serial No. 449,519, which eventuated into Patent No. 2,430,582, which application was a division of Serial No. 166,987, which eventuated into Patent No. 2,313,968.

While the drawings show preferred embodiments of my invention, various changes and modifications may be made within the scope of the appended claim. I, therefore, do not wish my claim limited to a greater degree than is necessitated by the state of the prior art.

Having now described my invention, I claim:

A cooking unit comprising, in combination, a skillet-shaped container having a laterally extending handle, a cover for the container pivotally connected to the handle, flanges extending upwardly and downwardly from the cover, supporting lugs within the flange on one face of the cover, an electric heating unit supported by and insulated from the lugs, current-carrying leads connected to the unit and adapted to be connected to a source of electric power, and a second pivotal connection between the cover and the container, said second pivotal connection being arranged at an angle to the first whereby to make possible the pivotal turning of the cover in two directions at substantially a right angle to each other.

ERNEST REICH.

REFERENCES CITED

The following references are of record in the file of this patent:

UNITED STATES PATENTS

| Number | Name | Date |
|---|---|---|
| Re. 22,176 | Russell et al. | Sept. 8, 1942 |
| 1,154,411 | Kuhn et al. | Sept. 21, 1915 |
| 1,179,986 | Warner | Apr. 18, 1916 |
| 1,552,335 | Mottlan | Sept. 1, 1925 |
| 1,751,219 | Seamon | Mar. 18, 1930 |
| 1,814,754 | James | July 14, 1931 |
| 1,874,836 | Trenner et al. | Aug. 30, 1932 |
| 1,966,411 | Kaufmann | July 10, 1934 |
| 1,969,878 | Dumas | Aug. 14, 1934 |
| 2,055,972 | Fritsche | Sept. 29, 1936 |
| 2,313,968 | Reich | Mar. 16, 1943 |